Figure 1:
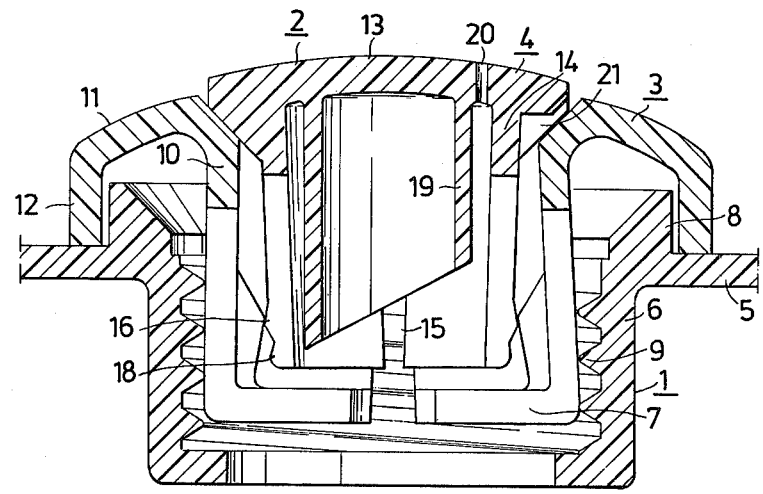

United States Patent [19]

Sköld

[11] Patent Number: 4,460,661
[45] Date of Patent: Jul. 17, 1984

[54] ARRANGEMENT FOR SEALING A STORAGE BATTERY CASING

[75] Inventor: Ulf Å. C. Sköld, Silverdalen, Sweden

[73] Assignee: Nordiska Ackumulatorfabriker Noack AB, Stockholm, Sweden

[21] Appl. No.: 419,459

[22] Filed: Sep. 17, 1982

[30] Foreign Application Priority Data

Sep. 25, 1981 [SE] Sweden ............................. 8105692

[51] Int. Cl.$^3$ ............................................. H01M 2/12
[52] U.S. Cl. ......................................... 429/89; 429/84
[58] Field of Search ....................... 429/84, 86, 87, 89, 429/185

[56] References Cited

U.S. PATENT DOCUMENTS 3,385,467  5/1968  Lindenberg ...................... 429/89 X
4,113,925  9/1978  Kohler et al. .................... 429/89 X
4,317,868  3/1982  Spiegelberg ..................... 429/89 X Primary Examiner—Brian E. Hearn
Assistant Examiner—Stephen J. Kalafut
Attorney, Agent, or Firm—Fred Philpitt

[57] ABSTRACT

The present invention relates to an arrangement for sealing a storage battery casing having at least one opening in the lid or cover (5) thereof, with the aid of a sealing plug (2) provided for each opening and retained in a sleeve-like fitting (1) surrounding the opening. The invention is characterized in that the sealing plug (2) includes a substantially sleeve-like outer plug part (3) and an inner plug part (4) arranged to be inserted axially into the outer plug part (3). The outer plug part (3) has a radially expandable portion intended for accommodation in the fitting (1), and the inner plug part (4) forms an expander means which, when inserted axially into the outer plug part (3), expands the expandable portion from a radially compressed state, in which the portion can be moved axially in the associated fitting (1), to a radially expanded state, in which the outer plug part (3) is retained in the sleeve-like fitting (1) by engagement of the expandable portion with the radially inwardly facing surface of the fitting.

12 Claims, 2 Drawing Figures

ARRANGEMENT FOR SEALING A STORAGE BATTERY CASING

The present invention relates to an arrangement for sealing a storage battery casing having at least one opening formed in the lid or cover thereof, with the aid of a sealing plug provided for each opening, said plug being retained in a sleeve-like fitting arranged around said opening.

Such arrangements are known to the art. One disadvantage with these known arrangements is that each of the sealing plugs is normally provided with an external screw thread. When assembling such an accumulator or battery, it is difficult to bring the plug into position in the lid or cover plate of the battery casing, since this requires the plugs to be firmly screwed manually into a corresponding screw-thread arrangement in said lid. If it is desired to automatize the work of screwing the plugs into their respective holes in the casing lid, certain drawbacks arise, one of which is that the operation takes a relatively long time to carry out. It is therefore an object of the invention to provide an arrangement of the aforesaid kind which enables the plugs to be placed in their respective openings in the casing lid more rapidly than has been possible hitherto, with the use of means which are more suited to automatization than those means used to-date.

To this end, an arrangement of the aforementioned kind is characterized, in accordance with the invention, in that each sealing plug comprises a substantially sleeve-like outer plug part and an inner plug part which can be inserted axially into said outer plug part; that the outer plug part is provided with a radially expandable portion arranged to be received in said sleeve-like fitting and the inner part plug forms an expander means which, when inserted axially in said outer plug part, expands said expandable portion from a radially compressed state, in which said expandable portion can be displaced axially in its respective fitting, to a radially expanded state in which the outer plug part is retained in the sleeve-like fitting by the engagement of said expandable portion with the radially inwardly facing side of said fitting.

In accordance with the invention, the outer plug part, and preferably also the inner plug part, can be made of a resilient material. Examples of such materials include plastics, such as thermoplastic resins, for example polyolefins, particularly polypropene, and also similar materials. This improves the possibility of repeated removal and effective replacement of the sealing plugs in their respective holes in the casing lid.

According to the invention, the aforementioned fitting on its radially inwardly facing side, and/or the outer plug part on the radially outwardly facing side of the radially expandable portion, can be provided with engaging means, such as projections, ridges or the like, for facilitating retention of the outer plug part in said fitting. This arrangement provides for more reliable retention of the sealing plugs in their respective fittings. Another advantage afforded by the arrangement according to the invention is that it can be applied in conventional types of storage batteries or accumulators provided with screw-threaded openings in the casing lid. Consequently, there is no need for a battery manufacturer to equip himself with different extrusion apparatus simply because he uses the arrangement according to the invention. Reliable retention of the sealing plugs in their respective fittings is particularly desirable in respect of maintenance-free batteries or accumulators, i.e. batteries which do not need to be topped-up with distilled water or the like, or which only need to be replenished to a greatly reduced extent compared with other batteries or accumulators.

In accordance with a further embodiment of the invention, the outer plug part has a head portion which is widened radially relative to the portion of said plug part received in said fitting, and which is arranged to abut the upper side of the casing lid. One advantage afforded herewith is that the outer plug part can be readily localized axially in the sleeve-like fitting.

According to another embodiment the expandable portion of the outer plug part is provided with one or more slots which extend from the inner end of said plug part substantially axially therealong. This provides for optimal expansion with relatively small axial forces on the part of the inner plug part.

According to an embodiment of the invention the outer plug part has arranged, preferably on its axially outer end, stop means, which determines the maximum extent to which the inner plug part can be inserted into the outer plug part. This enables the inner plug part to be positioned relative the outer plug part in a simple fashion.

According to still another embodiment for the purpose of expanding the expandable portion of the outer plug part, the inner plug part is arranged so that the axially inner end thereof will only act on an axially inner region of said portion exhibiting a reduced inner diameter. This embodiment will result in a very favourable expansion while using comparatively small axial forces for the inner plug part.

In accordance with the invention, a suitable arrangement is characterized by a snap-coupling acting between the outer and inner plug parts and effective to removeably hold the inner plug part in its intended axial position relative to the outer plug part. Preferably, the snap-coupling has the form of a ring bead arranged on the outside of the inner plug part and intended to be placed in a circular groove arranged in or axially inwardly of a ring bead on the inside of the expandable portion of the outer plug part.

This arrangement provides for reliable retention of the inner plug part in the outer plug part.

According to a further embodiment of the invention, the inner plug part is provided with a shank portion which has a radially widened head connected thereto and which is intended to be received in the radially expandable portion of the outer plug part. The shank portion preferably has the form of a radially slotted sleeve. This arrangement enables a saving in material and permits relatively wide tolerances to be applied in manufacture.

According to a further embodiment of the invention there is provided in the border region between the outer plug part and the head portion of the inner plug part a recess in which a tool can be inserted for removing the inner plug part against the action of the snap coupling. This arrangement enables the inner plug part, and therewith also the outer plug part, to be readily removed with the aid, for example, of a screwdriver or some like implement. Although in its widest scope the invention is intended for use with so-called maintenance-free storage batteries or accumulators, it will be understood that such batteries will require some attention during their useful life, and hence the desirability of being able to remove the sealing plugs in order to check the level of the battery water and the condition of the battery in general.

Figure 2:
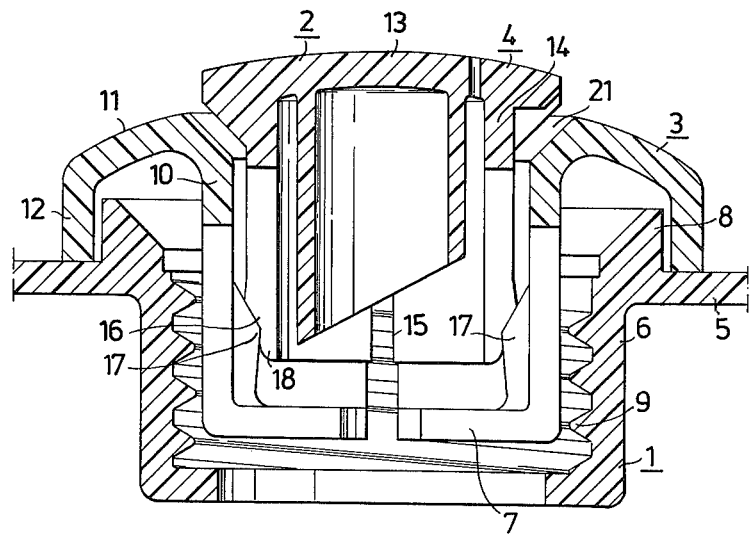

The invention will now be described in more detail with reference to the accompanying drawing, in which FIG. 1 illustrates an arrangement for closing an opening in the lid or cover plate of the battery casing with the aid of a sealing plus, which is shown in its sealing position, and FIG. 2 illustrates the arrangement shown in FIG. 1 with the plug in a non-sealing position.

In FIG. 1 there is shown a sleeve-like fitting 1 which surrounds a sealing plug 2, there being one such plug for each opening in the lid or cover plate of a battery casing. The sealing plug 2 comprises a substantially sleeve-like outer plug part 3 and an inner plug part 4 arranged to be inserted axially into the outer plug part 3. The sleeve-like fitting 1 is formed integrally with the lid 5 of the battery casing and includes a tubular part 6 which projects into the interior of the casing and is terminated with an end wall 7, in which there is provided an opening to the interior of the sleeve-like fitting 1. The fitting 1 is provided at the top thereof with an annular stiffening ridge 8 having an inwardly sloping surface. The tubular part 6 is provided internally with a screw-thread 9, said thread having the form of a helical bead with a sharp, slightly chamfered ridge or spine.

The outer plug part 3 includes a substantially tube-like shank portion 10 which is axially insertable into the tubular part 6 of the sleeve-like fitting 1, and a flange portion 11 which projects radially outwardly from the upper end of the tubular part 6 and slopes obliquely downwardly, the end of said flange portion 11 being bent and terminated by an axially extending portion 12 which extends parallel with the tubular portion 6. The axially extending flange portion 12 is, in this way, so formed that when the outer plug part 3 is inserted into the sleeve-like fitting 1, the flange portion 12 encircles the stiffening ridge 8, the battery lid 5 forming an abutment surface for the axial flange portion 12 when the outer plug part 3 is inserted into the tubular portion 6. The tubular shank portion 10 of the outer plug part 3, and the end wall 7 are provided with four longitudinally extending and radially extending slots respectively, through which the tubular portion 10 is radially expandable to a position in which the outer wall of said portion 6 engages the ridges of the screw-thread 9.

The inner plug part 4 includes a head 13 and a shank portion 14 formed integrally therewith, said shank portion having the form of a sleeve which is provided with slots 15 and which is open at its bottom. On the outside of the shank portion 14 there is provided a ring bead 16 which in one position, in which the inner plug part 4 is inserted into an intended axial position, is arranged to be located inwardly of a second ring bead 17 provided on the inside of the tubular shank portion 10. In this way there is provided a snap-coupling which is active between the outer plug part 3 and the inner plug part 4, to removeably retain the inner plug part 4 in an axial position relative to the outer plug part 3, in which the sealing plug 2 seals and closes its respective opening in the casing lid 5. As shown more clarly in FIG. 1, in this position the head 13 of the inner plug part 4 rests, via an oblique surface on the underside thereof, in an associated seating in the radial flange portion 11 of the outer plug part 3.

In FIG. 2, the inner plug part 4 is shown displaced axially from its position illustrated in FIG. 1, the plug part having been moved out of its snap-engagement with the outer plug part 3. To ensure that the inner plug part 4 is still held firmly in the outer plug part 3, the shank portion 14 has at the end thereof a ring bead 18 which, in the illustrated position, is located inwardly of the ring bead 17. The inner plug part 4 can be readily snapped out of engagement with the outer plug part 3 by simply manipulating the head 13 with the fingers of one hand.

The illustrated arrangement is highly advantageous, since it enables storage batteries to be quickly assembled in a simple fashion. When assembling a storage battery, the inner plug part 4 can either be completely separate from the outer plug part 3 or can be loosely held in said outer plug part 3 through the snap-coupling effect between the ring bead 18 of the inner plug part 4 and the ring bead 17 of the outer plug part 3.

When applying the first alternative, the outer plug part 3 is inserted into its associated opening in the battery lid 5, until the end surface of the axial flange portion 12 abuts the surface of the lid 5. The inner plug part 4 is then inserted into the outer plug part 3. As a result of the spring action afforded by the slots 15 in the inner plug part 4, and the expandability afforded by the slots in the outer plug part 3, the inner plug part 3, with its ring bead 16, will cause, under spring action, the expandable portions created by the slots in the outer plug part 4 to expand radially by engagement with the ring bead 17, so that the smooth outer surface of said expandable portions engage the screw-thread means 9 in the tubular portion 6 of the sleeve-like fitting 1, so as to create a firm, retaining joint between the fitting 1 and two plug parts 3 and 4.

When applying the second of said alternatives, the inner plug part 4 is first inserted into the outer plug part, but only to the extent where the ring bead 18 of the inner plug part passes beyond the ring bead 17 of the outer plug part 3. The whole of the plug parts 3 and 4 of the composite body formed are inserted into the opening surrounded by the sleeve-like fitting 1 to an extent where the flange portion 12 comes into contact with the upper surface of the battery lid 5.

Pressure can then be exerted on the head 13 of the inner plug part 4, causing the head to be moved into position in the seating on the radial flange portion 11 of the outer plug part 3, so that the ring bead 16 passes beyond the ring bead 17 to establish the desired snap-coupling between the outer plug part 3 and the inner plug part 4, while the expandable portion of the tubular shank portion 10 of the outer plug part 3 expands into firm engagement with the screw-thread means 9, said expandability being afforded by said slots.

The inner plug part 4 is also provided with a cylindrical, shielding wall 19 which projects downwardly from the head 13. The diameter of the cylindrical wall is smaller than the diameter of the shank portion 14, so as to form an annular gap between the inner surface of the shank portion 14 and the outer surface of the cylindrical wall 19. As illustrated in the drawing, the cylindrical wall 19 is obliquely cut at the bottom thereof. The annular gap communicates with atmosphere through an outlet 20 provided in the head 13. The cylindrical wall 19 forms a trap for droplets of electrolyte which may accompany the gases generated when charging the battery. The gases will leave the interior region of the cylindrical wall at that part thereof which affords the least resistance to flow, i.e. at the obliquely cut part of said wall, and will pass out through the sealing plug through the annular gap and the outlet opening 20. The separated droplets of electrolyte are collected within the confines of the cylindrical wall 19, and are permitted to run back into the plug at that part of the cylindrical wall having the greatest length.

The arrangement also includes the provision of a recess 21 in the border region between the outer plug part 3 and the head of the inner plug part 4, said recess being intended for a suitable tool, such as a screwdriver, to facilitate removal of the inner plug part 4 against the action of the aforedescribed snap-coupling. Thus, through provision of the aforementioned recess, it is possible to remove the sealing plug 2 from the casing lid in order to check the level of electrolyte in the battery or to take samples of the electrolyte in order to check its composition.

I claim:

1. An arrangement for sealing a storage-battery casing having at least one opening formed in the lid thereof, with the aid of a sealing plug which is retained in a sleeve-like fitting arranged around said opening, wherein the sealing plug comprises a substantially sleeve-like outer plug part and an inner plug part which can be inserted axially into said outer plug part, the outer plug part having a radially expandable portion intended to be received in the fitting, and the inner plug part forming an expander means which, when inserted axially into the outer plug part, expands said expandable portion from a radially compressed state, in which said expandable portion can be displaced axially in its associated fitting, to a radially expanded state, in which the outer plug part is retained in the sleeve-like fitting by engagement of said expandable portion with the radially, inwardly facing side of said fitting.

2. An arrangement according to claim 1, wherein the outer plug part, and preferably also the inner plug part, is made of a resilient material.

3. An arrangement according to claim 1 or claim 2, wherein the fitting is provided on its radially inwardly facing side, and/or the outer plug part is provided on the radially outwardly facing side of said part, with engaging means, which promote retention of the outer plug part in said fitting.

4. An arrangement according to claim 3, wherein the outer plug part is provided with a head part which is widened radially relative to said portion intended to be received in the fitting, said head part being arranged to abut the upper surface of the casing lid.

5. An arrangement according to claim 4, wherein the expandable portion of the outer plug part is provided with one or more slots which originate from the inner end of said plug part and extend substantially axially therealong.

6. An arrangement according to claim 5, wherein, for the purpose of expanding the expandable portion of the outer plug parts, the inner plug part is arranged so that the axially inner end thereof will only act on a region of said portion exhibiting an axially inwards, reduced inner diameter.

7. An arrangement according to claim 6, wherein the outer plug part has arranged, preferably on its axially outer end, stop means which determines the maximum extent to which the inner plug part can be inserted into the outer plug part.

8. An arrangement according to claim 7, wherein there is a snap-coupling means active between the outer plug part and the inner plug part for removeably retaining the inner plug part in an intended axial position relative to the outer plug part, said snap-coupling means having the form of a ring bead arranged on the outside of the inner plug part and intended to be placed in a ring groove in or axially inwardly of a ring bead on the inside of said portion of the outer plug part.

9. An arrangement according to claim 1, wherein the inner plug part has a shank portion intended to receive said portion of the outer plug part, and a radially widened head connected to said inner plug part, said shank portion preferably having the form of an axially slotted sleeve.

10. An arrangement according to claim 8, wherein a recess is arranged in the border region between the outer plug part and the head of the inner plug part for accommodating a tool by which the inner plug part can be removed against the action of said snap-coupling.

11. An arrangement according to claim 3 wherein said engaging means are projections.

12. An arrangement according to claim 3 wherein said engaging means are ridges.

* * * * *